2 Sheets--Sheet 1.

J. T. HAWKINS.
Machines for Making Spool Blanks.

No. 137,136. Patented March 25, 1873.

Witnesses:
Geo. K. Holt
W. A. Walhouse

Inventor:
John T. Hawkins

AM. PHOTO-LITHOGRAPHIC CO. N.Y. (OSBORNE'S PROCESS)

2 Sheets--Sheet 2.
J. T. HAWKINS.
Machines for Making Spool Blanks.
No. 137,136. Patented March 25, 1873.
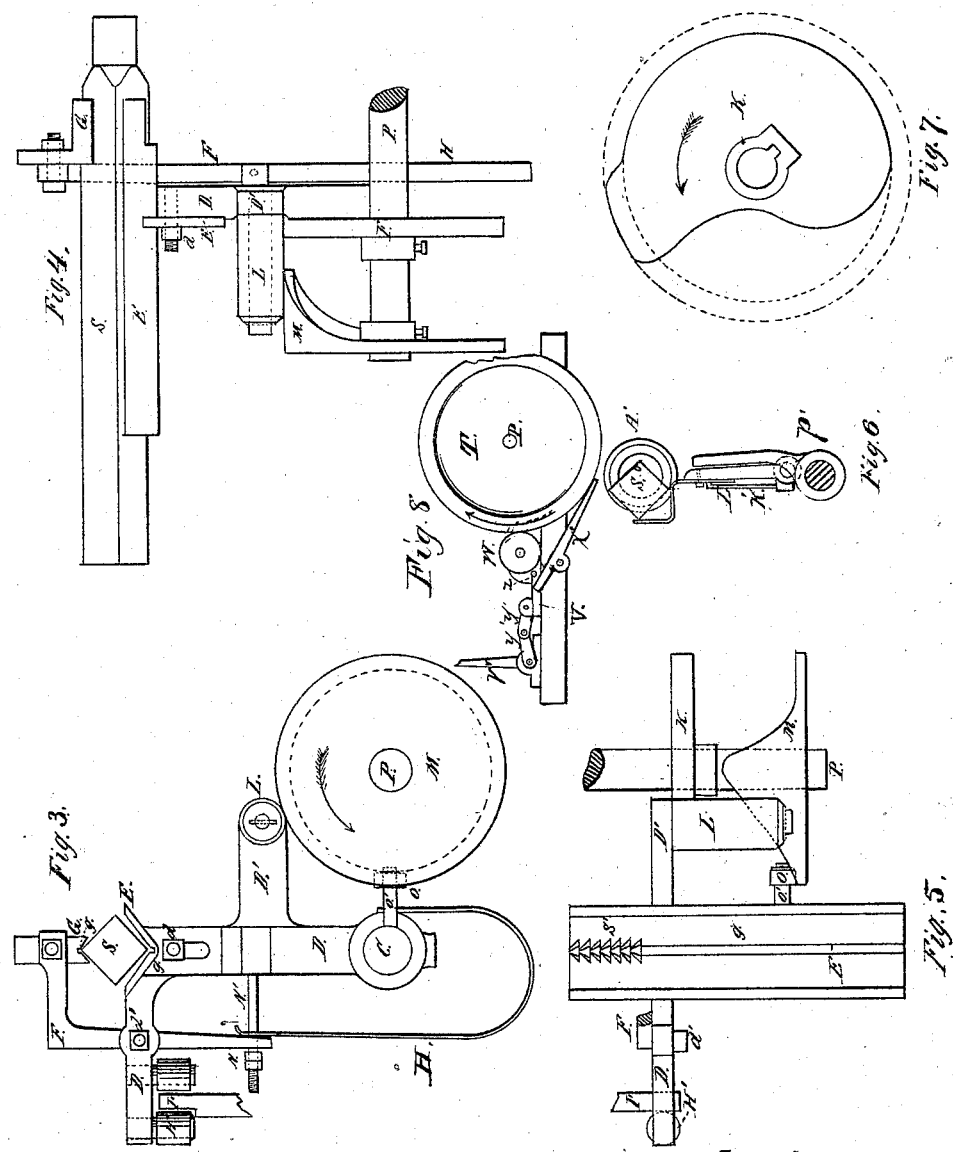
Witnesses.
Geo. H. Holt
W. A. Waterhouse
Inventor.
John T. Hawkins

UNITED STATES PATENT OFFICE.

JOHN T. HAWKINS, OF SALISBURY, VERMONT, ASSIGNOR OF ONE-HALF OF HIS RIGHT TO GEO. R. HOLT, OF SAME PLACE.

IMPROVEMENT IN MACHINES FOR MAKING SPOOL-BLANKS.

Specification forming part of Letters Patent No. 137,136, dated March 25, 1873.

*To all whom it may concern:*

Be it known that I, JOHN T. HAWKINS, of Salisbury, in the county of Addison and State of Vermont, have invented a new and useful Improvement in Spool-Blank Machines; and I do hereby declare that the following is a full, clear, and exact description of the same, reference being had to the accompanying drawing forming a part of this specification.

The object of the invention is to furnish an improved machine adapted for turning thread-spool blanks and other like articles from a suitable piece of timber, the more important agent for effecting this result being an oscillating reciprocating carriage for supporting and clamping the blank or bar of wood, arranged in such relation to a rotating cutter-head as to carry the wooden bar up to the same and hold it till the spool-blank is turned, and then into contact with a saw for severing the blank from the bar; the whole mechanism being automatic, and yet adapted to be thrown into and out of gear with the driving-shaft, as will be hereinafter fully set forth.

Figure 2:
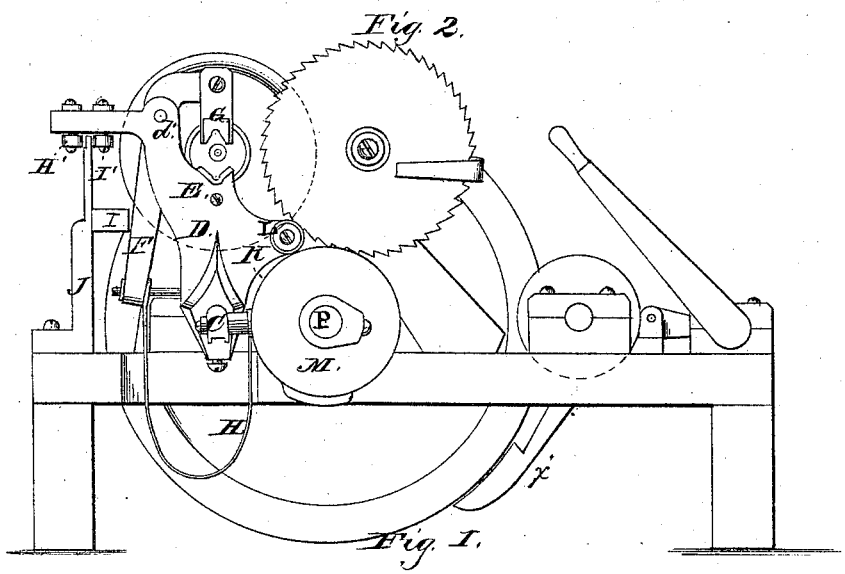
Figure 1:
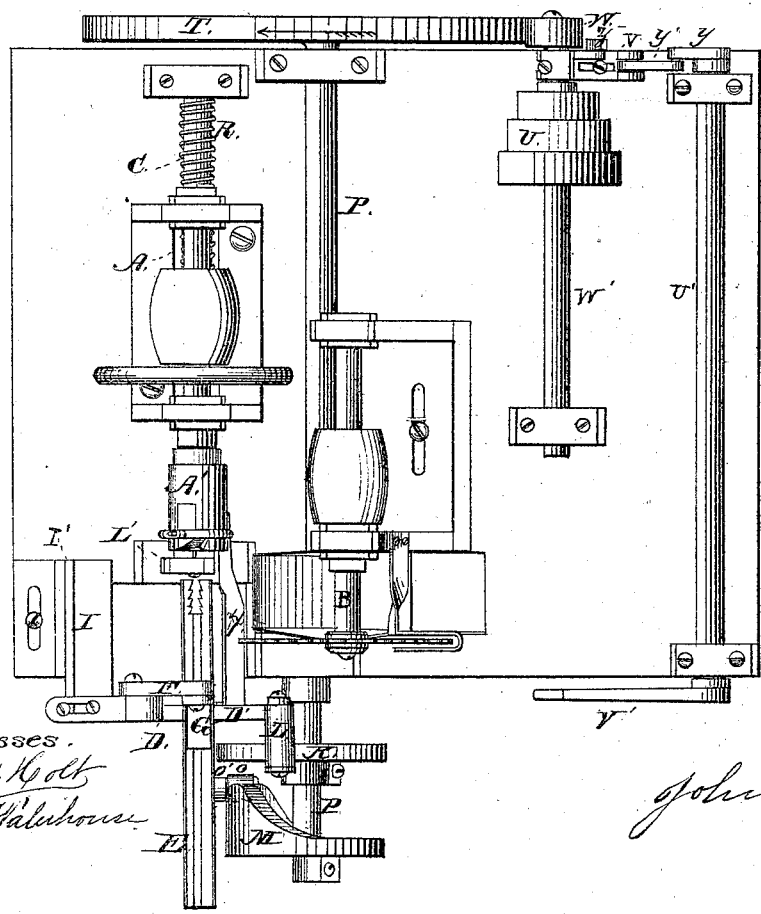

Figure 1, Sheet 1, is a plan view, and Fig. 2 an end elevation, of the machine. Fig. 3 is a front view, Fig. 4 is a side view, and Fig. 5 a plan, of the vibrating carrier, with its clamp, guide-rollers, and operating-cams. Fig. 6 is a front view of the vibrating rest; Fig. 7, a front view of the cam, which imparts a vibrating motion to the carrier. Fig. 8 is a side view of the brake mechanism.

Similar letters of reference indicate corresponding parts.

The spindle A of the ordinary lathe-head carries the cutter-socket A'. B is the saw-spindle, with the circular saw, as ordinarily used. C is a shaft, capable of either rotating or sliding endwise in its bearings. D is a vibrating and reciprocating arm secured to shaft C, and adjustable upon shaft C in direction of its length, but secured from rotating upon it by a feather or spline, and held in any position by a set-screw, (not seen,) so that shaft C and arm D vibrate and reciprocate together. E is a grooved carrier secured to the arm D by means of a vertical arm or block, (not seen,) and the bolt $d$ passing through a slot, so that the carrier may be adjusted vertically to accommodate varying diameters of work. F is a bent lever pivoted to D at the point $d'$ and carrying the grooved clamp G, which is also adjustable vertically like the carrier E for varying diameters of work, the adjustments of carrier and clamp G permitting the piece to be turned to be held central with the spindle A. The form of groove in carrier E is that of an obtuse angle with a small rectangular groove at its vertex, at the sides of which teeth are formed, the object of this form of groove being to securely hold the square stick from being rotated in the carrier by the cutters, and without tending to raise the clamp G against the force of the spring H, while the teeth prevent the stick from sliding endwise in the carrier. H is a ribbon-spring acting upon the lower end of lever F to force down the clamp G upon the square stick S, (Figs. 3 and 6.) N is a pair of check-nuts upon the screw N', which passes through slots in the lower end of lever F and the upper end of spring H. These nuts are for the purpose of regulating the action of spring H. I is a stop attached to the standard J, against which the lever F strikes when the arm D is thrown to the left of the central position, (by the action of the highest point of cam K upon the roller L,) and which raises the clamp G to allow the stick S to be advanced in the carrier E by the operator. P is a shaft carrying the cams K and M. O is a roller running on a stud, O', projecting from shaft C and engaging the cam M. L is a roller running on a stud from a branch, D', of the arm D, and engaging the cam K. The cam M gives a reciprocating motion and the cam K a vibrating motion to the shaft C and arm D. R is a helical spring surrounding shaft C, and attached to the spindle-head A' and shaft C at its respective ends. This spring has given to it both a torsional and thrusting stress, which serves to keep the roller O upon the face of the cam M, and at the same time the roller L upon the cam K. H' is a pair of guide-rollers running upon vertical studs projecting from the arm D, and engaging a guide, I', attached to the standard J. This guide is for the purpose of keeping the arm D in line with the axis of spindle A independently of the roller L and the lower concentric part of cam K. These rollers and the guide are used only where the work is required to be particularly smooth and correct, and may be made with one roller. For ordinary work the roller L, which is made sufficiently long for the purpose, forms a sufficiently correct guide by sliding endwise upon the lower concentric part of cam K. L' is a pivoted vibrating rest, adjustable vertically for varying diameters of work, actuated by a stud, X, projecting from the vibrating arm D, and a spring, K', as shown. The rest L' is for the purpose of supporting the end of the square stick S in line with the spindle A, when the last end piece of the stick is being advanced in the carrier E until the clamp G takes a secure hold upon it. T is a friction-pulley secured to shaft P. W is a small friction-pulley upon the same shaft W' with the cone-pulley U by which it is driven, engaging the pulley T, and causing the shaft P to rotate with its cams in the direction indicated by the arrows, Figs. 1, 3, and 8. The shaft W' runs in movable bearings V. U' is a small shaft carrying the crank-arm Y and hand-lever V', which, by means of the link Y', engages or disengages (at the will of the operator) the pulleys W and T. X' is a lever-brake pivoted to the bed-plate of the machine, the upper end of which engages the stud z projecting from the movable bearing V.

The operation of the hand-lever V' in disengaging the pulleys W and T, causes the brake X' to press upon the pulley T, and enables the operator to arrest the revolution of the shaft P at such point as shall place the roller L upon the highest concentric part of cam K, at which time the clamp G is elevated for the purpose of inserting a new stick beneath it.

As the shaft P rotates in the direction of the arrows, and when the roller L is upon the highest concentric part of cam K, the center of the stick S is thrown to the left of the center of the spindle A, and by the same action the spring H is compressed by the stop I, and the clamp G is elevated, releasing the stick S, which is advanced by the operator until it comes in contact with the end of the cutter-socket A', or a suitable stop placed in front of it (not shown) which determines the length of piece to be turned and sawed off. The cutter-socket will generally serve for a stop for the stick, although in rapid rotation, but when its form is such as to preclude its use as such stop a separate stationary stop is placed in proper position for the end of the stick to strike against, secured to any permanent part of the machine. After the stick is advanced to the stop the rotation of shaft C allows the roller L to drop to the lower concentric part of cam K, at which point the stick S becomes central with the spindle A, and the helical rise of cam M forces the roller O and shaft C, with its carrier E, toward the cutter-socket A', rounding, boring, or performing whatever operation upon the stick S may be required. The spring R then forces the roller O back down the curved fall of cam M, both in and out motions being performed while the roller L rests upon the lower concentric part of cam K. Continuing the rotation of shaft P the roller L then falls into the depression of cam K, the torsional stress of spring R throwing the carrier E (with the stick rounded or cut in whatever form desired, as shown in Fig. 6,) to the right toward the saw, for the purpose of cutting off the piece turned or bored. As the roller L rises out of the depression of cam K the arm D is thrown to the left until roller L lies again upon the highest part of cam K, and so on, as before.

In Fig. 6 the position of the square stick S is shown as it rests upon the vibrating-rest L', when the clamp G has released it, and the roller L is upon the highest point of cam K, the rest L' moving back to the central position by means of the spring K' as the movement of lever p' permits it. The end of carrier E nearest to cutter-socket A' is so formed or cut away as to pass over the top of rest L', thereby using the last end piece of wood as short as possible.

Having thus described my invention, what I claim as new, and desire to secure by Letters Patent, is—

1. The combination of cams K and M with carrier, provided with arms for engaging therewith, the carrier-shaft, spring R, and revolving cutter, substantially as specified.

2. The combination of guide I' and rollers H' with the pivoted vibrating carrier, substantially as specified.

3. The combination of spring H, pivoted lever F, and stop I with the vibrating carrier D E, substantially as specified.

4. The combination of spring H and pivoted lever F with clamp G and carrier D E, as specified.

5. The carrier E, provided with a groove and teeth on the sides or edges thereof, as specified.

6. The combination of rest L', spring K', and stop-lever p' with the carrier and cutter, as specified.

7. The combination of the brake X' with the friction-gear W T and its operating mechanism, as and for the purpose described.

JOHN T. HAWKINS.

Witnesses:
  GEO. R. HOLT,
  W. A. WATERHOUSE.